(12) United States Patent
Saegusa et al.

(10) Patent No.: US 9,085,647 B2
(45) Date of Patent: Jul. 21, 2015

(54) THERMOPLASTIC TRANSPARENT RESIN

(75) Inventors: Nobuya Saegusa, Kanagawa (JP);
Shojiro Kuwahara, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 2201 days.

(21) Appl. No.: 11/597,918

(22) PCT Filed: May 31, 2005

(86) PCT No.: PCT/JP2005/009916
§ 371 (c)(1),
(2), (4) Date: Dec. 7, 2007

(87) PCT Pub. No.: WO2005/116090
PCT Pub. Date: Dec. 8, 2005

(65) Prior Publication Data
US 2008/0213606 A1  Sep. 4, 2008

(30) Foreign Application Priority Data

May 31, 2004 (JP) .................................. 2004-161886
Aug. 26, 2004 (JP) .................................. 2004-246421

(51) Int. Cl.
*B32B 27/08* (2006.01)
*B29C 47/00* (2006.01)
*C08F 212/08* (2006.01)
(Continued)

(52) U.S. Cl.
CPC ............... *C08F 8/04* (2013.01); *B29C 47/0021* (2013.01); *B29C 47/065* (2013.01); *B32B 27/302* (2013.01); *B32B 27/308* (2013.01); *C08F 220/14* (2013.01); *C08F 220/18* (2013.01); *C08L 25/08* (2013.01); *C08L 33/08* (2013.01); *C08L 33/10* (2013.01); *C08L 33/12* (2013.01); *G02B 6/1221* (2013.01); *B29C 47/043* (2013.01); *B32B 2250/03* (2013.01); *C08F 2800/10* (2013.01); *C08F 2810/50* (2013.01)

(58) Field of Classification Search
None
See application file for complete search history.

(56) References Cited

U.S. PATENT DOCUMENTS 5,561,208 A * 10/1996 Takahashi et al. ............ 526/281
6,001,488 A * 12/1999 Kataoka et al. ............... 428/447
(Continued)

FOREIGN PATENT DOCUMENTS

CN          1109480          10/1995
EP          317263 A2 *      5/1989
(Continued)

OTHER PUBLICATIONS

Derwent abstract of JP 63170475 (1988).*
(Continued)

*Primary Examiner* — Frank D Ducheneaux
(74) *Attorney, Agent, or Firm* — Greenblum & Bernstein, P.L.C.

(57) ABSTRACT

A thermoplastic transparent resin which is produced by hydrogenating 70% or more of aromatic double bonds of a copolymer. The copolymer is produced by polymerizing a monomer composition containing at least one (meth)acrylic ester monomer and at least one aromatic vinyl monomer and has a molar ratio (A/B) of from 1 to 4 wherein A is a molar amount of a constitutional unit derived from the (meth)acrylic ester monomer and B is a molar amount of a constitutional unit derived from the aromatic vinyl monomer. The thermoplastic transparent resin is suitable for the production of a molded article such as optical article having a good color tone because molding defect is less produced.

7 Claims, 2 Drawing Sheets

(51) Int. Cl.
   *C08F 220/14* (2006.01)
   *C08F 220/18* (2006.01)
   *C08F 8/04* (2006.01)
   *B32B 27/30* (2006.01)
   *C08L 33/10* (2006.01)
   *C08L 33/08* (2006.01)
   *C08L 25/08* (2006.01)
   *C08L 33/12* (2006.01)
   *B29C 47/06* (2006.01)
   *G02B 6/122* (2006.01)
   *B29C 47/04* (2006.01)

(56) References Cited

U.S. PATENT DOCUMENTS

| | | | |
|---|---|---|---|
| 6,376,066 B1 * | 4/2002 | Kanzaki et al. | 428/336 |
| 6,451,924 B1 * | 9/2002 | Hahnfeld et al. | 525/338 |
| 2004/0164434 A1 * | 8/2004 | Tabar et al. | 264/1.6 |

FOREIGN PATENT DOCUMENTS

| | | |
|---|---|---|
| EP | 0 661 307 | 7/1995 |
| JP | 63-003011 | 1/1988 |
| JP | 63-043910 | 2/1988 |
| JP | 63-170475 | 7/1988 |
| JP | 64-1706 | 1/1989 |
| JP | 64-62307 | 3/1989 |
| JP | 01-103604 | 4/1989 |
| JP | 01-128059 | 5/1989 |
| JP | 01-132603 | 5/1989 |
| JP | 02-254434 | 10/1990 |
| JP | 04-075001 | 3/1992 |
| JP | 06-025326 | 2/1994 |
| JP | 07-114030 | 5/1995 |
| JP | 09-302176 | 11/1997 |
| JP | 2001-272501 | 10/2001 |

OTHER PUBLICATIONS

Aldrich Data Sheet (2013).*
Supplementary European Search Report dated Jan. 15, 2009, for Application No. EP 05 74 5974.
Chinese Official Action dated Nov. 14, 2008, for Application No. 200580016702.8. (Translation only).

* cited by examiner

THERMOPLASTIC TRANSPARENT RESIN

TECHNICAL FIELD

The present invention relates to thermoplastic transparent resins, thermoplastic resin sheets made of the thermoplastic transparent resins, processed thermoplastic resin sheets, and optical articles produced by injection-molding the thermoplastic transparent resin.

BACKGROUND ART

Thermoplastic resin sheets have been applied to transparent sheet substrates or front panels for display devices, glazing in hospitals, etc. Examples of the thermoplastic resins used in these applications include methacrylic resins (PMMA), polyethylene terephthalate resins (PET), polycarbonate resins (PC) and vinyl chloride resins (PVC). However, PMMA is poor in a heat deformation resistance and high in a water absorption although it is excellent in a surface hardness and weather resistance. PET is insufficient in a surface hardness although it is excellent in an impact resistance. PC is insufficient in a surface hardness, weather resistance and chemical resistance although it is excellent in a heat deformation resistance and impact resistance. PVC is poor in a heat deformation resistance although it is inexpensive and flame-retardant.

Methyl methacrylate/styrene copolymers (MS resins) obtained by modifying methacrylic resins by copolymerization to impart a low water absorption have been widely used as a transparent sheet substrate for display devices. However, MS resins have a low transparency as compared with methacrylic resins because of their aromatic ring structure, to limit their applications in some cases. In addition, MS resins have been required to be further improved in their dimensional stability and heat deformation resistance.

Resins for plastic optical articles such as plastic lenses and light guide plates which are produced by injection molding are required to have a high melt fluidity in addition to the above properties. If the melt fluidity of the resins is high, the resin can reach all the corners of a mold to provide a molded article which precisely reproduces the contour of the cavity.

The fluidity of molten resins may be controlled to some extent by varying the structure, molecular weight or molding temperature. However, when the primary structure of resin is changed to decrease a glass transition temperature, the resultant molded articles fail to have a heat deformation resistance. The fluidity can be improved also by reducing the molecular weight, but limited in view of mechanical properties. The fluidity becomes higher with increasing molding temperature. However, the range of molding temperature is limited because a heat degradation deteriorates the mechanical properties, a discoloration occurs, or the gas generated from volatile components impairs the appearance of molded articles.

In the application field of optical articles, the change of color for the worse due to discoloration is a most important problem. Also, a high heat deformation resistance is required so as to effectively reuse the pieces of scrap by recovery, crushing and re-molding. Hitherto, it has been attempted to improve the heat deformation resistance by adding an additive. However, the use of the additive should be avoided as much as possible in the application field of optical articles to enhance the optical purity. Therefore, it has been required to improve the heat deformation resistance of the resins themselves so as to prevent the discoloration due to the decomposition of resin.

The hydrogenation of the aromatic ring of styrene-based resins (hydrogenation of aromatic double bond) is known for a long time. Polyvinylcyclohexane obtained from polystyrene has an excellent transparency and heat deformation resistance although poor in the mechanical strength. With its excellent transparency and heat deformation resistance, the application of polyvinylcyclohexane to optical disk substrates has been studied (Patent Document 1). Patent Documents 2 and 3 disclose the application of a resin having a specific monomer composition to optical disks or plastic lenses. The resin is obtained by hydrogenating the aromatic double bond of MS resin. Since the proposed resins contain vinylcyclohexane repeating units in an amount of 50% or more of the total repeating units, the adhesion to metal is insufficient and the heat deformation resistance is not necessarily sufficient. Therefore, the properties required for the optical disk substrates are not obtained in some cases. When applied to plastic lenses, the mechanical properties fail to satisfy the practical requirement in some cases.

An example of the optical articles is a backlight-type light guide plate for use in surface light-emitting devices. A light guide plate with a size of 20 inch or smaller is produced by injection molding in many cases. A light guide plate for use in large-sized surface light-emitting devices with a size exceeding 20 inch is produced in many cases by cutting a thermoplastic resin sheet. With increasing size of recent liquid displays, the development of a surface light-emitting device having a uniform light-emitting performance with a high luminance without ununiformity is demanded. Further, with the increasing demand for color displays, the surface light-emitting device is also required to have an excellent color reproducibility and color stability. Recently, the surface light-emitting device is often operated under much severer conditions to improve the luminance, thereby arising considerable problems of the discoloration of the light guide plates due to its degradation and the change in the color of emitted light.

These problems are tried to be solved by the addition of various antioxidants or ultraviolet ray absorbents and the color compensation using additives. However, these methods cause ununiform luminance or color, thereby failing to achieve a precise color representation.

In addition, the increase in the size of display screen requires a low water absorption. When the resin absorbs water, the screen warps and the luminance and color becomes ununiform.

Optical screens such as transmission-type screens for projection televisions are usually constituted from lens units such as a Fresnel lens sheet and a lenticular lens sheet. The Fresnel lens sheet is produced by forming Fresnel lenses on a thermoplastic resin substrate. The lenticular lens sheet is produced by forming lenticular lenses on a thermoplastic resin substrate. The Fresnel lens has a stepwise lens surface in place of a continuous lens surface, and can be regarded as a concentric prism. The lenticular lens is a plate of lens array in which semi-cylindrical lenses are arranged side by side such that the lenses are in axially parallel to one another. As resins for these substrates, acrylic resins have been used in view of their good transparency, such as an acrylic resin added with a multi-layered rubber component (Patent Document 4), a methacrylic resin containing tert-butylcyclohexyl methacrylate units (Patent Document 5), and a methyl methacrylate/styrene copolymer resin containing the copolymerized styrene in an amount of 36% by weight (Patent Document 6).

When a substrate is made of a resin having a high water absorption such as PMMA, the screen is likely to cause a dimensional change. When being made of a resin having a low polarity such as polystyrene, the surface adhesion is poor to likely cause the lenses made of an ultraviolet curing resin to peel off the substrate. As the light-emitting source is recently changed from CRT to a liquid crystal display, a substrate with no birefringence comes to be strongly demanded. To meet such demand, the resin for the substrate is required to be well-balanced in a low water absorption, a low birefringence and a good adhesion to ultraviolet curing resins.

Another example of the optical articles includes a front panel for display devices. Important properties are antireflection, scratch resistance, stain resistance, etc. The front panel should transmit visible light therethrough as uniformly as possible, in addition to being resistant to warp due to the absorption of water.

Optical articles having a plate shape or a complicated structure such as a small-sized light guide plate is mainly produced by injection molding.

Other optical articles produced by injection molding includes, for example, a plastic lens. The material of the plastic lens should reproduce the cavity shape even in a thin-wall portion. To improve the recording density of optical recording media, it is recently studied to reduce the wavelength of laser for recording and reproduction of information, particularly, 350 to 450 nm. Therefore, a lens meeting such requirement is demanded.

Patent Document 7 discloses a vinyl alicyclic hydrocarbon-based resin as a resin suitable for the plastic lens, particularly, as a resin applicable to blue laser near 405 nm. However, the proposed resin is poor in mechanical properties upon use, because the lens cracks at its holding portion during the use, even when molded into a lens with a proper shape.

Still another example of optical articles is a substrate for optical recording media which is mainly made of polycarbonate. However, such substrate comes to face problems in the birefringence and warp, as the capacity of magneto optical recording disks is increased and the recording density is increased as in the case of developing the digital versatile disc or the blue laser diode. To solve these problems, a hydrogenated polystyrene is proposed as a substitute for polycarbonate (Patent Document 8). Another proposed substitute is a hydrogenated styrene/conjugated diene block copolymer in which styrene is block-copolymerized with a conjugated diene such as isoprene and butadiene to introduce a rubber component (Patent Document 9). However, since the haze may increase if the hydrogenation is incomplete, these hydrogenated styrene-based aromatic hydrocarbon polymers are not suitable for the substrate of optical recording media.

Patent Document 1: JP 63-43910A
Patent Document 2: JP 6-25326A
Patent Document 3: JP 4-75001A
Patent Document 4: JP 1-128059A
Patent Document 5: JP 2-254434A
Patent Document 6: JP 9-302176A
Patent Document 7: JP 2001-272501A
Patent Document 8: JP 7-114030B
Patent Document 9: Japanese Patent 2730053

DISCLOSURE OF THE INVENTION

An object of the present invention is to provide a thermoplastic transparent resin which is well-balanced in the required properties as mentioned above, such as transparency, heat deformation resistance, heat decomposition resistance, mechanical properties, low water absorption, weather resistance and light resistance. Another object is to provide a plastic optical article well-balanced in transparency, heat deformation resistance, heat decomposition resistance, mechanical properties, low water absorption, weather resistance and light resistance, which is made of the thermoplastic transparent resin.

The resins obtained by hydrogenating the aromatic double bond of MS resins having a low MMA copolymerization rate (MMA constitutional unit/styrene constitutional unit=0.92 or lower) as disclosed in Patent Documents 2 and 3 are not necessarily sufficient in the mechanical strength and not suitable for practical use. As a result of extensive researches in view of the above objects, the inventors have found that a thermoplastic resin obtained by hydrogenating 70% or more of aromatic double bonds of a copolymer having a specific constitutional unit composition, which is produced by polymerizing a monomer composition containing a (meth)acrylic ester monomer and an aromatic vinyl monomer, exhibits a very excellent balance in the properties such as transparency, heat deformation resistance, heat decomposition resistance, mechanical properties, low water absorbency, weather resistance and light resistance. The present invention has been accomplished on the basis of this finding.

Thus, the present invention relates to a thermoplastic transparent resin obtained by hydrogenating 70% or more of aromatic double bonds of a copolymer which is produced by polymerizing a monomer composition containing at least one (meth)acrylic ester monomer and at least one aromatic vinyl monomer and which has a molar ratio A/B of from 1 to 4 wherein A is a molar amount of a constitutional unit derived from the (meth)acrylic ester monomer and B is a molar amount of a constitutional unit derived from the aromatic vinyl monomer.

The present invention also relates to a thermoplastic resin sheet made of the thermoplastic transparent resin, a multi-layered thermoplastic resin sheet having a layer made of the thermoplastic transparent resin, and an optical article, such as a backlight-type light guide plate, a lens unit, a front panel for displays, a light guide plate, a plastic lens and a substrate for optical recording media, which is produced by using the thermoplastic transparent resin.

PREFERRED EMBODIMENTS FOR CARRYING OUT THE INVENTION

Figure 1:
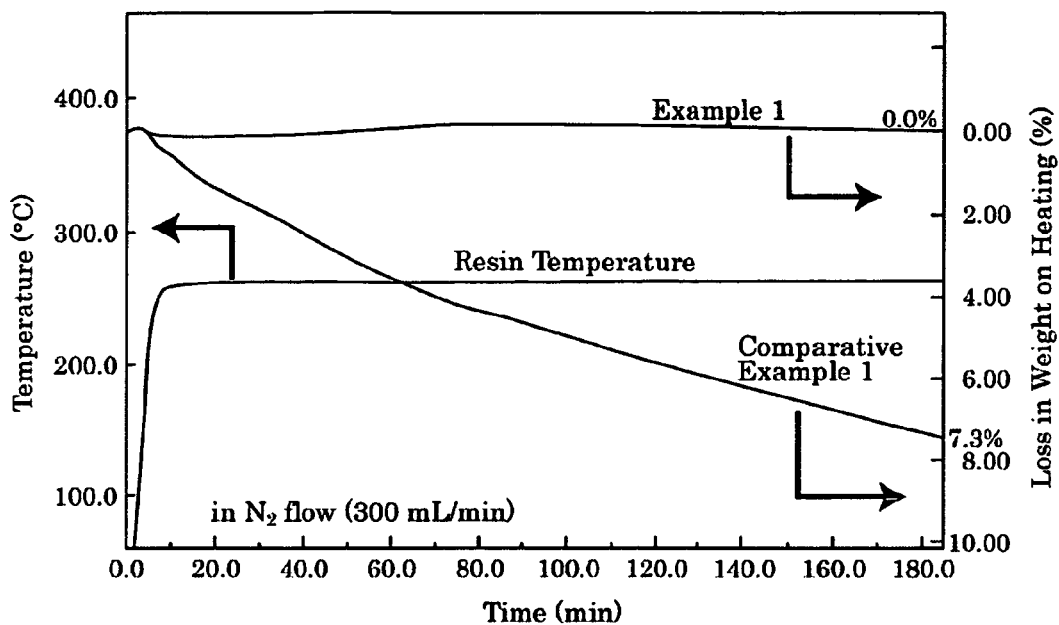
FIG. 1 shows a thermogravimetric curve obtained in the evaluation for heat decomposition resistance conducted in Example 1 and Comparative Example 1.

Examples of the (meth)acrylic ester monomer include alkyl (meth)acrylates such as methyl (meth)acrylate, ethyl (meth)acrylate, butyl (meth)acrylate, lauryl (meth)acrylate, stearyl (meth)acrylate, cyclohexyl (meth)acrylate and isobornyl (meth)acrylate; hydroxyalkyl (meth)acrylates such as (2-hydroxyethyl) (meth)acrylate, (2-hydroxypropyl) (meth)acrylate and (2-hydroxy-2-methylpropyl) (meth)acrylate; alkoxyalkyl (meth)acrylates such as (2-methoxyethyl) (meth)acrylate and (2-ethoxyethyl) (meth)acrylate; aromatic ring-containing (meth)acrylic esters such as benzyl (meth)acrylate and phenyl (meth)acrylate; and (meth)acrylic esters having a phospholipid-analogous functional group such as 2-(meth)acryloyloxyethyl phosphoryl choline. In view of a good balance in the properties, a sole use of alkyl methacrylate or a combined use of alkyl methacrylate and alkyl acrylate is preferred. The use of 80 to 100 mol % of methyl methacrylate and 0 to 20 mol % of alkyl acrylate is more preferred. Particularly preferred alkyl acrylate is methyl acrylate or ethyl acrylate. The "(meth)acrylic acid" used herein means methacrylic acid and/or acrylic acid.

Examples of the aromatic vinyl monomer include aromatic vinyl compounds such as styrene, α-methylstyrene, p-hydroxystyrene, alkoxystyrene and chlorostyrene.

The polymerization of the (meth)acrylic ester monomer and the aromatic vinyl monomer may be performed by known methods, with a radical polymerization being suitable for industrial production because of its simplicity. The radical polymerization is conducted by known methods such as a bulk polymerization method, a solution polymerization method, an emulsion polymerization method and a suspension polymerization method. For example, the bulk polymerization method or the solution polymerization method is performed continuously at 100 to 180° C. while continuously feeding a monomer composition containing monomers, a chain transfer agent and a polymerization initiator to a complete mixing vessel. In the solution polymerization method, a monomer composition is fed to the polymerization vessel together with a solvent, e.g., a hydrocarbon solvent such as toluene, xylene, cyclohexane and methylcyclohexane; an ester solvent such as ethyl acetate; a ketone solvent such as acetone and methyl ethyl ketone; an ether solvent such as tetrahydrofuran and dioxane; and an alcohol solvent such as methanol and isopropanol. After the polymerization, the reaction product solution is withdrawn from the polymerization vessel and fed to an extruder or a vacuum vessel to remove the volatile components, to obtain the copolymer.

In case of the methacrylic copolymers, the molar ratio of the constitutional units is not necessarily the same as the molar ratio of the monomers initially charged, and is determined by amounts of the monomers actually introduced into the copolymer by the polymerization. The molar ratio of the constitutional units is the same as the molar ratio of the monomers initially charged if the conversion of the monomers into the copolymer is 100%. However, since the conversion is actually 50 to 80% and the monomer having a higher reactivity is more easily introduced into the polymer, the molar ratio of the monomers initially charged is generally different from the molar ratio of the constitutional units. Therefore, a desired molar ratio of the constitutional units is obtained by adequately controlling the molar ratio of the monomers initially charged.

The copolymer to be hydrogenated has a molar ratio of the constitutional units ((meth)acrylic ester monomer unit/aromatic vinyl monomer unit=A/B) of from 1 to 4. When the molar ratio A/B is less than 1, the resultant resin may be unsuitable for practical use because of a poor mechanical strength. When exceeding 4, the effect of improving the glass transition temperature by the hydrogenation may be insufficient because the amount of the aromatic double bond to be hydrogenated is too small. The molar ratio of the constitutional units (A/B) is preferably from 1 to 2.5 and more preferably from 1 to 2 in view of a good balance in the properties.

The copolymer is dissolved in an appropriate solvent and then hydrogenated. The solvent for the hydrogenation may be the same or different from that for the polymerization. Preferably usable is a solvent which has a higher ability to solve the copolymers before and after hydrogenation and hydrogen and which is inert to hydrogenation. Examples thereof include hydrocarbon solvents such as cyclohexane and methyl cyclohexane; ester solvents such as ethyl acetate; ketone solvents such as acetone and methyl ethyl ketone; ether solvents such as tetrahydrofuran and dioxane; and alcohol solvents such as methanol and isopropanol.

The hydrogenation is preferably performed at 60 to 250° C. under a hydrogen pressure of 3 to 30 MPa by a known batch or continuous flow manner. When the reaction temperature is too low, the hydrogenation is difficult to proceed. When being too high, the molecular weight may be reduced by the breaking of molecular chain or the ester linkage may be undesirably hydrogenated. To prevent the reduction of the molecular weight due to the breaking of molecular chain and allow the reaction to proceed smoothly, it is preferred to suitably select the reaction temperature and hydrogen pressure according to the kind of the catalyst, its concentration in the reaction system, the concentration of the copolymer in the reaction system, and its molecular weight.

Known hydrogenation catalysts are usable. Examples thereof include solid catalysts composed of a porous carrier made of carbon, alumina, silica, silica/alumina or diatomaceous earth, which supports a metal such as nickel, palladium, platinum, cobalt, ruthenium and rhodium or a compound such as oxides, salts and complexes of these metals, with the catalyst supporting nickel, palladium or platinum on carbon, alumina, silica, silica/alumina or diatomaceous earth being preferred. The supporting amount is preferably from 0.1 to 30% by weight.

The hydrogenation degree is 70% or more, preferably 80% or more and more preferably 90% or more (each inclusive of 100% by weight), each based on the total aromatic double bond. If less than 70%, the resin is clouded to reduce the transparency in some cases, and the effect of improving the properties by increasing the glass transition temperature is little.

The thermoplastic transparent resin of the present invention has a transparent appearance because visible light is well transmitted therethrough. Since the loss due to the reflection on the surface of a molded article is inevitable, the upper limit of the total light transmittance depends upon the refractive index ($n_D$). In case of normal incidence, the reflectance R on the surface is expressed by the formula: $R=(n_D-1)^2/(n_D+1)^2$. Since the reflection occurs twice on front and rear surfaces, the upper limit of the total light transmittance of the material having a refractive index $n_D$ is represented by $100\times(1-2R)$%. For example, the reflectance R of PMMA having a $n_D$ value of 1.492 is calculated as 0.039 and the maximum total light transmittance is 92.2%. The total light transmittance of a 3.2 mm-thick molded article according to the present invention is preferably 90% or more. Since the optical material requires a higher transparency, the total light transmittance thereof is more preferably 91% or more and most preferably 92% or more.

The thermoplastic transparent resin of the present invention is excellent in the heat decomposition resistance especially in a nitrogen atmosphere. A zipper decomposition characteristic of methacrylic resins occurs at around 260° C. at which the methacrylic resins are usually molded by an injection molding or extrusion molding. It is known that the zipper decomposition starts at a terminal double bond and proceeds. By suppressing such heat decomposition at around 260° C., the molding defects such as silver streaks and foaming are reduced and an optical product is stably produced without discoloration. In the present invention, the heat decomposition resistance is measured and evaluated using a thermogravimetric analyzer. 5 mg of the resin placed on a platinum pan was measured after kept at 260° C. (±2.0° C.) for 3 h in a nitrogen atmosphere at a flow rate of 300 mL/min. The heat decomposition resistance was evaluated by the degree of thermogravimetric reduction. The degree of thermogravimetric reduction is preferably 5% by weight or less, more preferably 3% by weight or less and most preferably 2% by weight or less (each inclusive of zero). As described above, the hydrogenation degree of the thermoplastic transparent resin is 70% or more of the total aromatic double bonds and closely related to the heat decomposition resistance. Since the terminal double bonds are hydrogenated preferentially to the aromatic double bonds, a high heat decomposition resistance is obtained if the hydrogenation degree of the aromatic double bonds reaches 70% or more.

The thermoplastic transparent resin has a flexural strength of preferably 70 to 130 MPa and more preferably 74 to 130 MPa. Such flexural strength is sufficient to provide an optical material having good mechanical properties.

The thermoplastic transparent resin may be heat-melted and formed into a desired shape by known methods such as injection molding and extrusion molding. Since the thermoplastic transparent resin is excellent especially in the heat decomposition resistance, the molding defects due to heat degradation are little caused in any of the know molding methods, to erasure the production of molded articles having a good color tone. The molded articles are applicable to optical articles which should transmit the light during the use, such as light guide plates, light guide members, optical fibers, front panels for displays, plastic lenses, prisms, substrates for lens units, optical filters, optical films and substrates for optical recording media.

Since the birefringence of the thermoplastic transparent resin is low, the optical articles are, irrespective of the molding methods and their shapes, extremely suitable for the applications requiring to transmit a polarized light, such as light guide plates for liquid crystal displays, plastic lenses, substrates for lens units and substrates for optical recording media.

The number of the particles of foreign matters in the thermoplastic transparent resin is preferably as extremely low as possible. In addition to external impurities, the foreign matters may include substances incompatible with the resin such as catalyst residues, gelled products and by-products which are introduced to the thermoplastic transparent resin during the polymerization step. Except for the applications where the transmitted light should be scattered by the addition of a light diffusing agent, etc., a large number of the particles of foreign matters is not preferred in the applications not utilizing scattered light, because the loss of transmission is large. The content of the particles of foreign matters having a particle size of 1 μm or more is substantially zero, and the number of the particles of foreign matters having a particle size of 0.5 μm or more but less than 1 μm is preferably $3 \times 10^4$ particles/g or less, preferably $2 \times 10^4$ particles/g or less. The particle size may be measured using a light-scattering microfine particle detector. The number of the particles of foreign matters having a particle size of 0.5 μm or more but less than 1 μm is preferably $5 \times 10^3$ particles/g or less, if an especially high transparency is desired. The content of the particles of foreign matters can be reduced, for example but not limited to, by filtering a solution containing the polymer occurring in the production of the thermoplastic transparent resin through a membrane filter having a pore size of 0.5 μm or less and preferably 0.2 μm or less at least one time, or through an electric charge-capturing filter. The content of the particles of foreign matters can be also reduced by conducting the step which is exposed to surrounding atmosphere, such as a step of cooling the strands which are melt-extruded from an extruder, a pelletizing step, a sheet-forming step, and a step of introducing the pellets into an injection-molding machine, in an extremely clean atmosphere. At least one of these steps is preferably performed in an atmosphere having a cleanness of Class 5 or higher prescribed in ISO 14644-1.

The content of volatile components other than the additives in the thermoplastic transparent resin is preferably 3000 ppm or less, more preferably 1000 ppm or less and still more preferably 500 ppm or less (inclusive of zero). When an optical article having a much higher quality is desired, the content of the volatile components is reduced preferably to 500 ppm or less, more preferably to 300 ppm or less and still more preferably to 200 ppm or less. The volatile components may include organic solvents, unreacted monomers and modified products thereof. When the content of the volatile components is too large, flow marks, voids, surface defects, etc. are easy to occur during the molding step, to impair the uniformity of the properties of optical articles. The content of the volatile components can be reduced, for example but not limited to, by conducting the step of extruding the polymer, etc. under conditions suitable for removal of solvents.

(A) Thermoplastic Resin Sheet

The most important form for the use of the thermoplastic transparent resin is a thermoplastic resin sheet obtained by extruding the resin. Although the thermoplastic resin sheet can be produced generally by a casting method in which a solution of resin is cast over a surface and the solvent is evaporated off or a heat press method in which resin pellets in a plate mold are heated and pressed, preferably produced in the present invention by a melt extrusion using a sheet extruder, i.e., a single-screw extruder or twin-screw extruder equipped with a T-die (flat die).

The thickness of the thermoplastic resin sheet is preferably from 0.01 to 10 mm. Within the above range, the mechanical strength is sufficient and the fabricability by thermoforming is good. Although depending upon the applications, the thickness is more preferably from 0.1 to 8 mm and still more preferably from 0.5 to 5 mm.

The temperature of the resin upon extrusion is from 200 to 300° C. When less than 200° C., the molten resin is less fluidized, to make it difficult to reproduce the shape of a roll surface on the surface of the resin sheet. When more than 300° C., the resin decomposes to cause the discoloration, the deterioration of the heat deformation resistance and the discomfortable working environment due to malodor. The resin temperature upon extrusion is more preferably from 220 to 280° C.

The thermoplastic resin sheet has a transparent appearance, because the transmission of visible light therethrough is good unless additives such as a light diffusing agent and pigments are added or the surface thereof is roughened. The total light transmittance of a blank sheet (3.2 mm-thick) made of only the thermoplastic resin is 90% or more. Since the loss of the light due to the reflection on the surface of molded articles cannot be avoided, the upper limit of the total light transmittance varies depending upon the refractive index of the sheet. A still higher transparency is required for optical materials in some cases, and therefore, the total light transmittance is more preferably 91% or more and most preferably 92% or more.

Since the transparency is good over a broad range of wavelength, the thermoplastic resin sheet exhibits good weather resistance and light resistance. Therefore, the present invention meets the demand in markets to minimize the discoloration upon indoor and outdoor use for a long period of time. The discoloration may be evaluated by change in YI value (ΔYI). A lesser change in YI value means a more excellent weather resistance and light resistance. Since YI is for evaluating the yellowness, ΔYI may be lessened to some extent by the addition of a colorant. However, such addition makes the resin sheet blackish, to reduce the light transmittance. Although the weather resistance and light resistance can be improved by the addition of an ultraviolet absorber or an antioxidant, these properties are evaluated in the present invention on a thermoplastic resin sheet without the color control and the blend of additives. The weather resistance and the light resistance are not necessarily identical to each other, but they are in common with respect to the function to withstand the deterioration of resins due to light. In the present invention, the light resistance is measured by a mercury lamp exposure, and the weather resistance is estimated from the measured light resistance. $\Delta YI$ of the thermoplastic resin sheet is preferably less than 2 in an optical path of 2.0 mm when exposed to a mercury lamp for 600 h under the conditions of a distance of 30 cm, an irradiation intensity of 0.8 mW/cm$^2$, and a surface temperature of the sample at 60° C.

The thermoplastic resin sheet is high in the surface hardness and excellent in the scratch resistance. A thermoplastic resin sheet having a low scratch resistance is easily scuffed on its surface upon its production or use, to usually necessitate hard coatings. The thermoplastic resin sheet may also be coated with these hard coatings. Since the performance of the hard coatings depends upon the surface hardness of the resin sheet, the scratch resistance of the hard coatings is particularly enhanced further. In the present invention, the surface hardness is evaluated by a pencil hardness. The surface hardness of the thermoplastic resin sheet having no hard coating is preferably 2H or higher and more preferably 3H or higher, whereas preferably 4H or higher and more preferably 5H or higher when a hard coating is provided.

The thermoplastic resin sheet is also excellent in the heat deformation resistance. Although depending upon the shapes of molded articles and the strain during the molding, the heat-resistant temperature upon practical use is mainly determined by a glass transition temperature of the raw material. The glass transition temperature of the thermoplastic resin is preferably from 110 to 140° C.

The thermoplastic resin sheet has a low saturated water absorption and is excellent in the dimensional stability. A molded article in a sheet form is generally required to have a low saturated water absorption, because it warps or deflects when the amount of absorbed water distributes in a thickness direction. The saturated water absorption of the thermoplastic resin sheet is preferably from 0.1 to 1.2% by weight and more preferably from 0.2 to 0.8% by weight.

The thermoplastic resin sheet has a high heat decomposition resistance even in the absence of an antioxidant. However, the oxidative decomposition resistance can be enhanced by adding an adequate antioxidant. Known antioxidants such as hindered phenol-based antioxidants and phosphoric acid-based antioxidants are usable alone or in combination of two or more. The amount to be added is preferably from 50 to 10000 ppm on the basis of the resin.

The thermoplastic transparent resin may also contain, if required, other additives such as antistatic agents, colorants such as pigments and dyes, light diffusing agents, ultraviolet ray absorbents, mold release agents, plasticizers, lubricants, flame retardants and bactericides, in an amount not adversely affecting the balance of its properties.

Since the thermoplastic transparent resin is excellent in the heat decomposition resistance, the scrap formed during its production can be reused after being crushed and mixed to the raw resin, to considerably increase the yield of the product. Thermoplastic resins are generally degraded and discolored by the history of thermal treatment when subjected to repeated thermoforming. However, such degradation and discoloration can be minimized in the present invention. Although the thermoplastic resin sheet can be produced only from such scrap, it is preferred to mix the scrap to the raw resin in view of stabilizing the quality of the thermoplastic resin sheet. The mixing ratio of the scrap is preferably 20% by weight or less, more preferably 10% by weight or less and still more preferably 5% by weight or less on the basis of the total weight of the scrap and the raw resin.

The thermoplastic resin sheet has either a single-layered structure or a multi-layered structure obtained by co-extrusion. The construction of layered structure, i.e., the number of layers and the kind of resin for each layer can be determined without limitation. For example, in a two-kind/three-layered sheet, the surface properties such as scratch resistance can be enhanced by forming the surface layer (skin layer) from the resin of the present invention. Although such resin sheet is also excellent in the weather resistance and light resistance and has a low birefringence, a multi-layered resin sheet having good weather resistance and light resistance and a low birefringence as well as a good balance in the mechanical properties and low water absorption can be obtained, particularly, by co-extruding a benzene ring-containing resin for forming a core layer and the resin of the present invention for forming a skin layer. Thus, by forming the surface layer from the resin of the present invention, the weather resistance, light resistance and low birefringence of the multi-layered sheet are considerably enhanced even when the thickness is small. This is because the weather resistance, light resistance and low birefringence strongly depend upon the properties of resin forming the surface layer. Examples of the benzene ring-containing resin include styrene resins, MS resins, polycarbonate resins, polyester resins and polyallylate resins, with MS resins being particularly preferred in view of balance in the properties.

The co-extrusion may be performed by known methods, in which the resin of the present invention and other resins are co-extruded from a co-extrusion machine composed of a plurality of extruders and a die having a means for combining molten resin streams, and the co-extruded resins are then cooled. The thickness of the skin layer is, but not limited to, preferably from 10 to 1000 μm, more preferably from 50 to 500 μm and still more preferably from 70 to 300 μm, whereas the thickness of the core layer is preferably from 0.01 to 10 mm, more preferably from 0.1 to 8 mm and still more preferably from 0.5 to 5 mm.

(B) Light Guide Plate

The thermoplastic resin sheet may be used for producing various optical articles. For example, the thermoplastic resin sheet or multi-layered thermoplastic resin sheet may be cut into a backlight-type light guide plate. The light guide plate is used to cause the surface emission of a line light source or a point light source. To ensure a uniform surface emission (diffusibility) and prevent the image of light source from being reflected on a light-transmitting surface (hiding property), fine particles are dispersed throughout the thermoplastic resin sheet to scatter the incident light as known in the art. The kind, size and amount to be added of the fine particles have been widely studies (JP 7-214684A).

Examples of the fine particles include, but not limited to, organic fine particles such as crosslinked particles of methyl methacrylate polymers, crosslinked particles of styrene polymers and crosslinked particles of methyl methacrylate-styrene copolymers, and inorganic fine particles such as crosslinked siloxane-based fine particles, calcium carbonate fine particles, barium sulfate fine particles and titanium oxide fine particles. These fine particles may be used alone or in combination of two or more. If the difference between the refractive index of the fine particles and that of the resin is large, the light diffusibility is enhanced and the amount of use can be reduced. In view of the balance of the light diffusibility and the hiding property, the difference in refractive indices is preferably from 0.05 to 0.15. The average particle size of the fine particles is preferably from 0.1 to 20 μm. If less than 0.1 μm, a sufficient light diffusibility is not obtained and the light-emitting surface of the light guide plate changes its color to yellow. If exceeding 20 μm, the light diffusibility is reduced and the surface flatness and smoothness become poor in some cases. The average particle size is more preferably from 0.1 to 15 μm and still more preferably from 2 to 10 μm.

The backlight-type light guide plate does not need the addition of an antioxidant or ultraviolet absorber because its light resistance is excellent. Nevertheless, a known antioxidant or ultraviolet absorber may be added, unless the color reproducibility and the color stability are adversely affected. Examples thereof include hindered phenol-based antioxidants and phosphoric acid-based antioxidants, which may be used alone or in combination of two or more. The amount to be added is preferably from 50 to 500 ppm on the basis of the resin.

A mold release agent, for example, glycerol fatty esters such as glycerol monostearate, higher alcohols such as stearyl alcohol and higher fatty acids such as stearic acid, a colorant, an antistatic agent and an impact modifier may be added. These additives may be added in an amount not adversely affecting the effects of the present invention, preferably in an amount of 5000 ppm or less.

(C) Lens Unit Having Thermoplastic Resin Sheet as Substrate

The thermoplastic resin sheet or multi-layered thermoplastic resin sheet may also be used as a substrate for lens units. The lens unit is produced by forming at least one kind of lens on one or both surfaces of the substrate (sheet) which is cut out from the resin sheet. Examples of the substrates include those for lens units of optical screens, for example, transmission-type screens for projection televisions.

A Fresnel lens sheet for the lens units is produced, for example, by forming Fresnel lenses on the surface of sheet (substrate) by heat pressing, or forming Fresnel lenses on the surface of the sheet by curing an ultraviolet-curable resin. A lenticular lens sheet for the lens units is produced, for example, by extruding the resin through a mold roll having a cavity with a lenticular lens profile to form lenticular lenses on the surface of sheet simultaneously with the sheet-forming. In view of the productivity, it is preferred to adhere a film having lenses formed thereon or form lenses from an ultraviolet-curable resin.

The substrate for lens units may be blended, if required, with at least one additive in the sheet-forming process, which is selected from light diffusing agents, ultraviolet absorbers, antioxidants, colorants, plasticizers, mold release agents, antistatic agents, impact modifiers and so on.

(D) Front Panel

The thermoplastic resin sheet or multi-layered thermoplastic resin sheet may be cut to produce a front panel for displays. As described above, it is known that the hardness of hard coat formed on the substrate reflects the hardness of the substrate surface to some extent. Namely, a hard coat formed on a surface with a low hardness fails to have a sufficient hardness in some cases. Since the front panel for displays has a high surface hardness and a good scratch resistance, the surface properties can be further enhanced by forming a hard coat on its surface. The front panel for displays may be blended, if required, with at least one additive in the sheet-forming process, which is selected from light diffusing agents, ultraviolet absorbers, antioxidants, colorants, plasticizers, mold release agents, antistatic agents, impact modifiers and so on.

The hard coat may be one known in the optical application field. The hard coat is formed, for example, by curing a polyfunctional, polymerizable compound having two or more (meth)acryloyl groups such as urethane (meth)acrylates, polyester (meth)acrylates and polyether (meth)acrylates by polymerization under the irradiation of an activation energy ray such as ultraviolet ray and electron beam, or by heat-curing a silicone-, melamine- or epoxy-based crosslinkable resin. The hard coat may contain particles of inorganic oxides such as silicon dioxide, aluminum oxide, magnesium oxide, tin oxide, silicon monoxide, zirconium oxide and titanium oxide. The hard coat is formed by applying a hard coat solution on a substrate by a known coating method such as spin-coating and roll-coating, and then curing the applied solution by the irradiation of ultraviolet ray or electron beam or by heating. The hard coat solution may be diluted with a solvent to make the adhesion of the coating to the substrate easy or regulate the thickness of the coating.

An anti-reflection layer may be formed on the front panel by a known method without specific limitation. The anti-reflection layer may be a single- or multi-layered thin film made of inorganic oxides or inorganic halides which are formed by a known method such as a vacuum vapor deposition method, an ion-plating method and a sputtering method, or a thin film formed by applying a fluorine-containing polymer.

To impart a near-infrared absorbing power and an electromagnetic shielding property, the front panel may be included with a metal salt such as copper salt or may be provided thereon with an electroconductive layer.

Although usable in the sheet form as described above, the thermoplastic resin sheet may be formed into a shaped article with a desired shape by a known thermoforming method such as a vacuum air-pressure forming. Examples of such shaped article include the optical articles described above, instrument panels for automobiles or airplanes, sheet substrates for lamination, housings for medical equipments and building materials.

(E) Injection-Molded Optical Articles

In addition to the extrusion for forming the resin into shaped articles with sheet form, another important forming method is an injection-molding method. In the injection-molding method, the cylinder temperature is preferably from 220 to 320° C. and more preferably from 230 to 300° C. When being excessively high, the resin may be decomposed or deteriorated, to cause the reduction in the strength and the discoloration. When being too low, the shaped article suffers a residual stress to increase the birefringence, and the shape of cavity is difficult to be reproduced. The mold temperature is preferably from 50 to 180° C. and more preferably from 80 to 150° C. When being excessively high, the productivity is reduced because of the mold-release defects and prolonged molding cycle. When being too low, the birefringence is increased and the shape of cavity is difficult to be reproduced. The injection pressure is preferably from 30 to 200 MPa and more preferably from 60 to 150 MPa. The pressure holding time is preferably from 1 to 300 s and more preferably from 5 to 150 s. When being excessively long, the resin is decomposed or degraded, and the molding shrinkage becomes large when being too low. The cooling time is preferably from 5 to 300 s and more preferably from 10 to 150 s. The productivity is reduced when being too long, and the birefringence increases and the shape of cavity is difficult to be reproduced when being too short. With conditions within the above ranges, the resultant optical articles are well-balanced in the mechanical strength, birefringence, mold release property, reproducibility of cavity shape, productivity, etc.

(F) Injection-Molded Light Guide Plate

As described above, the light guide plates for displays having a size of 20 inch or less are generally produced by an injection-molding method. Surface light-emission apparatuses with such size are not equipped with a direct backlight unit but generally have an edge light unit (side light unit) in which the light from a line light source such as cold cathode tube or LED light source disposed on the end surface of a wedge injection-molded plate is transmitted in the direction perpendicular to the incident direction.

The light guide plate may be processed in various manners to transmit the incident light uniformly throughout the surface. For example, the light-transmitting surface is subjected to a light diffusion treatment, or the surface opposite to the light-transmitting surface is dot-printed with a white ink or finely processed into a prism shape. Further, a light-reflecting layer such as a silver-deposited sheet and a white film may be adhered to the surface other than the light-transmitting surface. The processing may be conducted after injection molding. However, it is preferred in view of efficiency to perform the molding and the processing of the surface simultaneously by using a mold having a desired pattern.

Since the light guide plate obtained by injection-molding the resin of the present invention has a high transmittance to visible light, a high-performance surface light emission apparatus having a high luminance can be produced by incorporating the light guide plate. The surface light emission apparatus is composed of the light guide plate and a light source. Example thereof includes an edge-type surface light emission apparatus composed of a wedge light guide plate and a light source disposed at a thicker end, which is used for cellular phones, personal digital assistants, cameras, watches, note-type personal computers, displays, illuminations, traffic signals, automotive tale lamps and fire indication for induction heating cookers. Examples of the light source include a fluorescent lamp, a cold cathode tube, LED and self-emitting materials such as organic EL.

(G) Injection-Molded Plastic Lens

The resin of the present invention may be injection-molded into plastic lenses. The plastic lenses are suitable as optical lenses for pick-up devices of optical recording media such as optical disks and magneto optical disks and optical recording/reproducing apparatuses.

In general, injection-molded optical articles suffer residual stress to increase the birefringence. If a plastic lens of an optical pick-up device has a high birefringence, the light spot shape is made elliptical to reduce the recording and reproducing performance of optical recording media. The resin of the present invention is particularly suitable for this application because the birefringence of molded articles is low.

(H) Injection-Molded Substrate for Optical Recording Media

The resin of the present invention is suitably used for the production of a substrate for optical recording media by injection molding. The substrate combines a high light transmittance, a low haze, a low water absorption and a low birefringence.

For the production of the substrate for optical recording media, the glass transition temperature of the resin is preferably from 105 to 140° C. and more preferably from 110 to 140° C. when measured at a heating rate of 10° C./min using a differential scanning calorimeter (DSC). Within the above range, a microstructure formed on the substrate, i.e., a land-groove structure and pits are stably kept even when exposed to a high-temperature atmosphere, for example, temperatures as high as 80° C.

The substrate for optical recording media preferably has a light transmittance of 90% or more. The light transmittance is a total light transmittance of a 2 mm-thick molded plate measured according to JIS K7105-1981 (Method A). When less than 90%, the substrate is not suitable for use in the application requiring the transmission of light such as optical recording media, because the resin absorbs light.

The substrate for optical recording media preferably has a haze of 1% or less. The haze is measured according to JIS K7105 on a 2 mm-thick molded plate. When more than 1%, the substrate is not suitable for use in optical recording media, because light is scattered to make the reading of information difficult.

Depending upon the requirements of intended use, a recording layer, a reflecting layer, a protective layer, etc. is formed on the substrate. If needed, the substrates may be laminated.

EXAMPLES

The present invention will be described in more detail below with reference to the following examples and comparative examples. However, these examples are only illustrative and not intended to limit the invention thereto. The thermoplastic transparent resin, thermoplastic resin sheet, multi-layered thermoplastic resin sheet, backlight-type light guide plate, lens unit, injection-molded light guide plate and substrate for optical recording media were evaluated by the following methods.

I. Evaluation of Thermoplastic Transparent Resin (1) Molar Ratio of Constitutional Units in Copolymer Calculated from values measured by $^1$H-NMR (400 MHz: $CDCl_3$).

(2) Degree of Hydrogenation

Calculated from the reduction in absorption at 260 nm measured by UV spectrometry before and after hydrogenation according to the following formula:

$$\text{Degree of Hydrogenation} = 100 \times [1 - (A_2 \times C_1)/(A_1 \times C_2)]$$

wherein $A_1$ is an absorbency at a concentration $C_1$ of the resin before hydrogenation and $A_2$ is an absorbency at a concentration $C_2$ of the resin after hydrogenation.

(3) Heat Decomposition Resistance

After holding 5 mg of a resin on a platinum pan at 260° C. (±2.0° C.) for 3 h under a nitrogen flow of 300 mL/min, the loss in weight was measured. The heat decomposition resistance was evaluated by the calculated rate of loss in weight on heating. A smaller value of the rate of loss shows a lesser heat decomposition of the resin, i.e., a good heat decomposition resistance. The thermogravimetric analysis was conducted using a thermogravimetric analyzer (TGA) "RTG220 Model" manufactured by Seiko Denshi Kogyo Co., Ltd.

(4) Glass Transition Temperature (Tg)

Calculated by a midpoint method on the results obtained by the calorimetric analysis on 10 mg of a resin under heating at a rate of 10° C./min using a differential scanning calorimeter (DSC) available from Seiko Denshi Kogyo Co., Ltd.

(5) Total Light Transmittance

Measured on a 3.2 mm-thick flat plate by a transmission method using "Z-Sensor Σ80NDH" available from Nippon Denshoku Industries Co., Ltd.

(6) Flexural Test

An injection-molded test piece (126×12×3.4 mm) was annealed at a temperature 20° C. lower than Tg for 16 h and then conditioned for 88 h or longer in an atmosphere of 23° C. and a relative humidity RH of 50%. A flexural strength and flexural modulus of the conditioned test piece were measured according to JIS K7203.

II. Evaluation of Thermoplastic Resin Sheet
(7) Total Light Transmittance and Haze Measured on a 2.0 mm-thick, melt-extruded thermoplastic resin sheet by a transmission method using a color/turbidity meter "COH-300A" available from Nippon Denshoku Industries Co., Ltd.

(8) Light Resistance

A test piece (150 mm×70 mm) was cut out form a 2.0 mm-thick, melt-extruded thermoplastic resin sheet and held on a sample holder of a fade meter equipped with a mercury lamp "H400-F" for fading test available from Harinson Toshiba Lighting Corp. After the irradiation for 600 h under the conditions of a sample-to-light source distance of 30 cm and an irradiation intensity of 0.8 mW/cm$^2$, a difference ($\Delta$YI) between YI values before and after the irradiation was determined using a color/turbidity meter "COH-300A" available from Nippon Denshoku Industries Co., Ltd. The temperature on the surface of the sample during the irradiation was 60° C.

(9) Surface Hardness

Evaluated by a pencil hardness test according to JIS K5400 on a 2.0 mm-thick, melt-extruded thermoplastic resin sheet.

(10) Saturated Water Absorption

A 2.0 mm-thick, melt-extruded thermoplastic resin sheet was cut into a test piece of 50 mm square. The test piece was dried at 80° C. by a hot air dryer until the weight no longer changed, to measure the dried weight of the test piece. The dried test piece was immersed in distilled water of ordinary temperature until the absorption of water was saturated, and then, the weight of the test piece (water-absorbed weight) was measured. The saturated water absorption was calculated from the following formula:

Saturated Water Absorption=[(water-absorbed weight)−(dried weight)]/(dried weight)×100.

(11) Recyclability

Scraps by-produced in the production of a thermoplastic resin sheet were crushed and mixed with a raw resin in a predetermined amount. The mixture was extruded into a 2.0 mm-thick resin sheet (recycle article). The YI values of the recycled article and the original thermoplastic resin sheet made of a raw resin containing no scrap were measured. The recyclability was evaluated by the difference ($\Delta$YI) between the measured YI values. The YI values were measured using a color/turbidity meter "COH-300A" available from Nippon Denshoku Industries Co., Ltd. Since resins are generally colored yellow when subjected to heat history, the smaller the $\Delta$YI, the more excellent the recyclability.

III. Evaluation of Multi-Layered Thermoplastic Resin Sheet
(12) Birefringence of Sheet (Retardation)

A multi-layered thermoplastic resin sheet was cut into a test piece of 150 mm×150 mm. The test piece was measured for the retardation at 9 different positions using an automatic birefringence meter "ADT-130N" available from ORC Manufacturing Co., Ltd. The birefringence was evaluated by an average of the measured values. The smaller the average value, the lower the birefringence.

IV. Evaluation of Backlight-Type Light Guide Plate

A thermoplastic resin sheet incorporated with a light diffusing agent was cut to obtain a sheet for light guide plate. The sheet for light guide plate was evaluated for the total light transmittance, haze, saturated water absorption and light resistance in the same manner as described above.

V. Evaluation of Lens Unit

Using a dispenser, an urethane-based, ultraviolet-curable resin was applied to a chromium-plated mold for producing Fresnel lens in a thickness of 50 to 150 μm. Next, a thermoplastic resin sheet was laminated under pressure to the resin in the mold while preventing the encapsulation of air. The urethane-based, ultraviolet-curable resin was cured by the irradiation of ultraviolet ray from a high-pressure mercury lamp and the cured product was released from the mold, to obtain a Fresnel lens unit, which was then evaluated for the adhesion by the following method.

(13) Adhesion

A lattice pattern (10×10 squares) was formed on the ultraviolet-cured, urethane-based resin sheet by cutting with 1-mm intervals using a knife. A piece of cellophane adhesive tape was adhered to the lattice pattern. The number of the peeled square cuts (cured resin) when peeling off the cellophane adhesive tape form the resin sheet was counted. The results were evaluated according to the following ratings.

| Number of Peeled Cuts | Ratings |
| --- | --- |
| 0 | A: usable without difficulty |
| from 1 to 10 | B: limit practically accepted |
| 11 or more | C: not suitable for practical use because of possible peeling during the production and lack of reliability of quality in long-term use |

VI. Evaluation of Injection-Molded Light Guide Plate
(14) Reproducibility of Cavity Shape A prism surface of a molded light guide plate was observed under an optical microscope for defects such as sink marks, cutouts and roughness. When having such defects, the light guide plate was classed as a defective. The results were evaluated by the following ratings.

| Number of Defectives per 100 Products | Ratings |
| --- | --- |
| 0 | A |
| from 1 to 10 | B |
| 11 or more | C |

(15) Uniformity of Transmitted Light

A white polyester reflection plate was placed under the surface having roughened patterns, and a cold cathode tube was disposed at the thicker end, to produce a surface light emission apparatus. The luminance was measured by a luminance meter disposed 30 cm above the surface having no roughened pattern. The measurement was made at 9 different positions, and the uniformity of transmitted light was evaluated by the difference between the maximum and minimum of the measured values.

VII. Evaluation of Substrate for Optical Recording Media
(16) Reproducibility of Cavity Shape A molded disk was observed under an optical microscope for defects such as sink mark, cutout and roughness. When having such defects, the disk was classed as a defective. The results were evaluated by the following ratings.

| Number of Defectives per 100 Products | Ratings |
| --- | --- |
| 0 | A |
| from 1 to 10 | B |
| 11 or more | C |

(17) Heat Resistance

The disk was held at 80° C. for 24 h, and then observed again in the same manner as in the evaluation for the reproducibility. The results were evaluated by the following ratings.

A: Microstructure was still maintained.
C: One or more defects were found.

Production Example 1

Production of Copolymer

A monomer composition of a monomer component (59.9 mol % of methyl methacrylate and 39.9 mol % of styrene) and a polymerization initiator ($2.1 \times 10^{-3}$ mol % of t-amyl peroxy-2-ethylhexanoate) was continuously fed to a 10-L complete mixing vessel equipped with a helical ribbon blade at a rate of 1 kg/h and continuously polymerized at 150° C. under an average residence time of 2.5 h.

The polymerization product solution was discharged from the bottom using a gear pump while keeping the level of liquid in the vessel constant. The discharged solution was introduced, while maintaining at 150° C., into an extruder equipped with a vent to evaporate volatile components, extruded into strands, and then cut into pellets (resin A1). The molar ratio of the constitutional units (A/B) in the obtained copolymer was 1.5.

Figure 2:
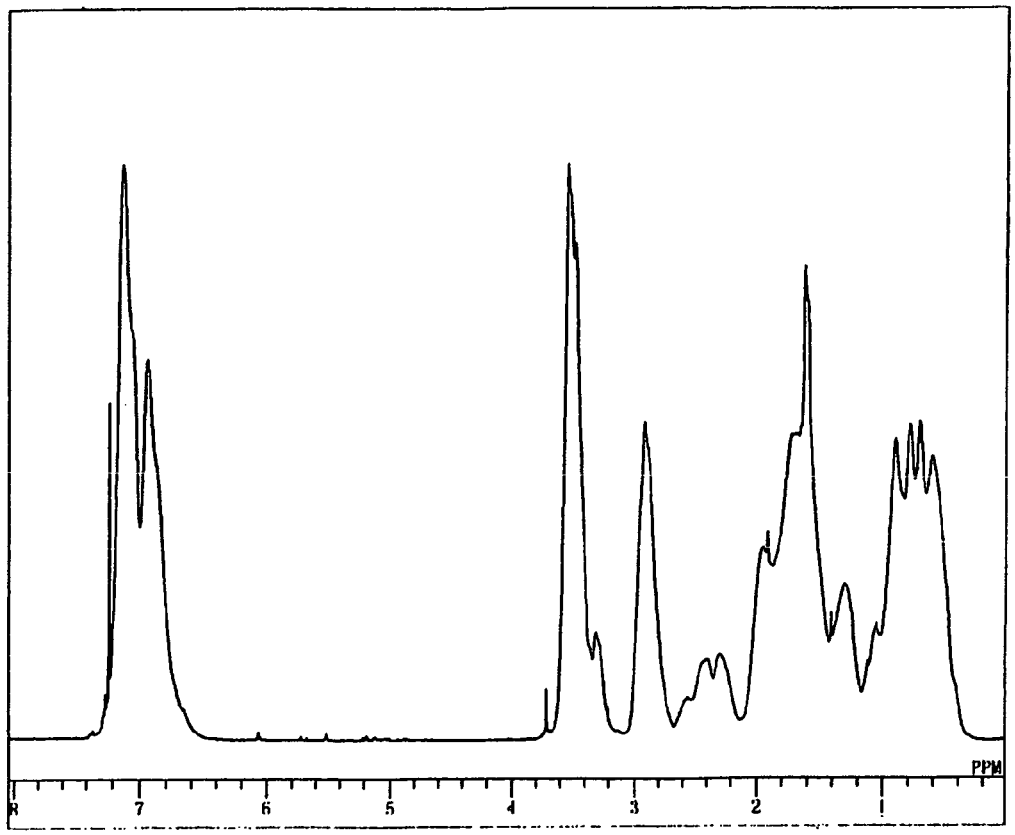
FIG. 2 shows an NMR chart of the resin A1 produced in Production Example 1.

The NMR chart of the resin A1 is shown in FIG. 2 in which strong signals attributable to aromatic ring protons are found at 6.5 to 7.3 ppm. The absorbance at 260 nm of a solution of 16.4 mg of the resin A1 in 15 mL of chloroform was 1.093.

Example 1

Thermoplastic Transparent Resin

The resin A1 was dissolved in dioxane to prepare a 10 wt % dioxane solution. A 1000-mL autoclave was charged with 500 parts by weight of the 10 wt % dioxane solution and one part by weight of 10 wt % Pd/C available from N.E. Chemcat Corporation, and the contents were held at 200° C. under a hydrogen pressure of 10 MPa for 15 h to conduct the hydrogenation. After filtering off the catalyst, the dioxane was removed by distillation under heating to concentrate the reaction solution to 50% by weight. The concentrated solution was repeatedly diluted with toluene to a concentration of 10% by weight, to replace the solvent with toluene, thereby obtaining a 50 wt % toluene solution. The toluene solution was introduced into an extruder equipped with a vent to evaporate volatile components, extruded into strands, and cut into pellets, to obtain pellets of the thermoplastic transparent resin (resin A2). The degree of hydrogenation was 96%.

Figure 3:
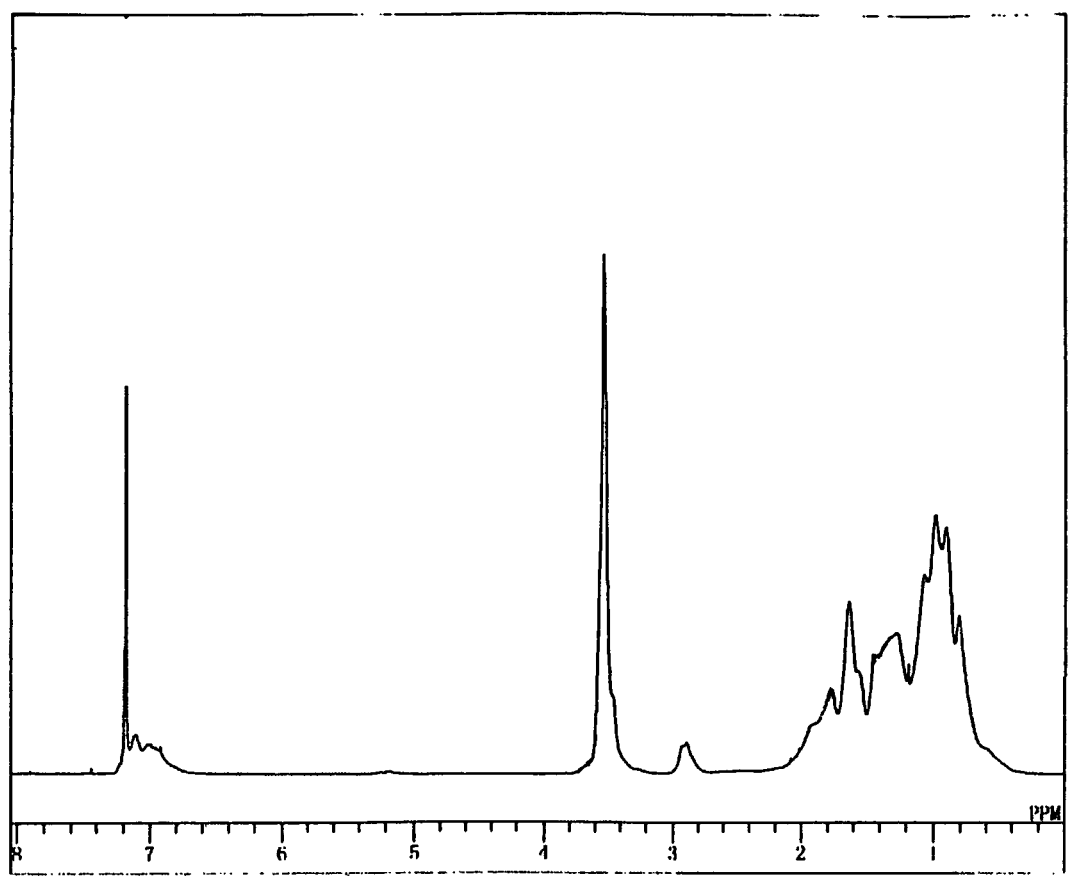
FIG. 3 shows an NMR chart of the resin A2 produced in Example 1.

The NMR chart of the resin A2 is shown in FIG. 3. The strong signals attributable to aromatic ring protons at 6.5 to 7.3 ppm found in FIG. 2 are extremely reduced in the peak area, indicating that the aromatic double bonds were hydrogenated. The absorbance at 260 nm of a solution of 62.5 mg of the resin A2 in 5 mL of chloroform was 0.521. The degree of hydrogenation calculated from the absorbance of the resin A1 at 260 nm and the concentration of the sample was 96%.

The measured heat decomposition resistance of the resin A2 is shown in Table 1. The resin A2 was injection-molded at a cylinder temperature of 260° C. using an injection molding machine "Autoshot 100B" available from Fanuc Ltd., to prepare various test pieces, which were then evaluated for the glass transition temperature, total light transmittance, flexural strength and flexural modulus. The results are shown in Table 1.

Example 2

Thermoplastic Transparent Resin

The procedure as in Example 1 was repeated except that the hydrogenation time of the resin A1 was shortened to 10 h, thereby obtaining a thermoplastic transparent resin having a different degree of hydrogenation (resin A3; degree of hydrogenation: 72%). The resin A3 was evaluated for the heat decomposition resistance, glass transition temperature, total light transmittance, flexural strength and flexural modulus in the same manner as in Example 1. The results are shown in Table 1.

Comparative Example 1

Properties of Copolymer

The resin A1 was evaluated for the heat decomposition resistance, glass transition temperature, total light transmittance, flexural strength and flexural modulus in the same manner as in Example 1. The results are shown in Table 2.

Comparative Example 2

Thermoplastic Resin

The procedure as in Example 1 was repeated except that the hydrogenation time of the resin A1 was shortened to 3 h, thereby obtaining a thermoplastic transparent resin having a different degree of hydrogenation (resin A4; degree of hydrogenation: 52%). The resin A4 was evaluated for the heat decomposition resistance, glass transition temperature, total light transmittance, flexural strength and flexural modulus in the same manner as in Example 1. The results are shown in Table 2.

Production Example 2

Production of Copolymer

The procedure as in Production Example 1 was repeated except for using a monomer component composed of 80.0 mol % of methyl methacrylate and 19.8 mol % of styrene, thereby synthesizing a copolymer (resin B1). The molar ratio between constitutional units in the copolymer (A/B) was 4.0.

Example 3

Thermoplastic Transparent Resin

The procedure as in Example 1 was repeated except for using the resin B1 to conduct the hydrogenation, thereby obtaining a thermoplastic transparent resin (resin B2). The degree of hydrogenation was 100%. The resin B2 was evaluated for the heat decomposition resistance, glass transition temperature, total light transmittance, flexural strength and flexural modulus in the same manner as in Example 1. The results are shown in Table 1.

Example 4

Thermoplastic Transparent Resin

The procedure as in Example 3 was repeated except that the hydrogenation time of the resin B1 was shortened to 3 h, thereby obtaining a thermoplastic transparent resin having a different degree of hydrogenation (resin B3; degree of hydrogenation: 76%). The resin B3 was evaluated for the heat decomposition resistance, glass transition temperature, total light transmittance, flexural strength and flexural modulus in the same manner as in Example 1. The results are shown in Table 1.

Comparative Example 3

Properties of Copolymer

The resin B1 was evaluated for the heat decomposition resistance, glass transition temperature, total light transmittance, flexural strength and flexural modulus in the same manner as in Example 1. The results are shown in Table 2.

Comparative Example 4

Thermoplastic Resin

The procedure as in Example 3 was repeated except that the hydrogenation time of the resin B1 was shortened to 1.5 h, thereby obtaining a thermoplastic transparent resin having a different degree of hydrogenation (resin B4; degree of hydrogenation: 45%). The resin B4 was evaluated for the heat decomposition resistance, glass transition temperature, total light transmittance, flexural strength and flexural modulus in the same manner as in Example 1. The results are shown in Table 2.

Production Example 3

Production of Copolymer

The procedure as in Production Example 1 was repeated except for using a monomer component composed of 50.7 mol % of methyl methacrylate, 9.3 mol % of methyl acrylate and 39.8 mol % of styrene, thereby synthesizing a copolymer (resin C1). The molar ratio between constitutional units in the copolymer (A/B) was 1.6.

Example 5

Thermoplastic Transparent Resin

The procedure as in Example 1 was repeated except for using the resin C1 to conduct the hydrogenation, thereby obtaining a thermoplastic transparent resin (resin C2). The degree of hydrogenation was 97%. The resin C2 was evaluated for the heat decomposition resistance, glass transition temperature, total light transmittance, flexural strength and flexural modulus in the same manner as in Example 1. The results are shown in Table 1.

Example 6

Thermoplastic Transparent Resin

The procedure as in Example 5 was repeated except that the hydrogenation time of the resin C1 was shortened to 3 h, thereby obtaining a thermoplastic transparent resin having a different degree of hydrogenation (resin C3; degree of hydrogenation: 72%). The resin C3 was evaluated for the heat decomposition resistance, glass transition temperature, total light transmittance, flexural strength and flexural modulus in the same manner as in Example 1. The results are shown in Table 1.

Comparative Example 5

Properties of Copolymer

The resin C1 was evaluated for the heat decomposition resistance, glass transition temperature, total light transmittance, flexural strength and flexural modulus in the same manner as in Example 1. The results are shown in Table 2.

Comparative Example 6

Thermoplastic Resin

The procedure as in Example 5 was repeated except that the hydrogenation time of the resin C1 was shortened to 1.5 h, thereby obtaining a thermoplastic transparent resin having a different degree of hydrogenation (resin C4; degree of hydrogenation: 50%). The resin C4 was evaluated for the heat decomposition resistance, glass transition temperature, total light transmittance, flexural strength and flexural modulus in the same manner as in Example 1. The results are shown in Table 2.

Production Example 4

Production of Copolymer

The procedure as in Production Example 1 was repeated except for using a monomer component composed of 20.4 mol % of methyl methacrylate and 79.4 mol % of styrene, thereby synthesizing a copolymer (resin D1). The molar ratio between constitutional units in the copolymer (A/B) was 0.25.

Comparative Example 7

Thermoplastic Resin

The procedure as in Example 1 was repeated except for using the resin D1 to conduct the hydrogenation, thereby obtaining a thermoplastic transparent resin (resin D2). The degree of hydrogenation was 95%. The resin D2 was evaluated for the heat decomposition resistance, glass transition temperature, total light transmittance, flexural strength and flexural modulus in the same manner as in Example 1. The results are shown in Table 2.

Comparative Example 8

Thermoplastic Resin

The procedure as in Comparative Example 7 was repeated except that the hydrogenation time of the resin D1 was shortened to 3 h, thereby obtaining a thermoplastic transparent resin having a different degree of hydrogenation (resin D3; degree of hydrogenation: 76%). The resin D3 was evaluated for the heat decomposition resistance, glass transition temperature, total light transmittance, flexural strength and flexural modulus in the same manner as in Example 1. The results are shown in Table 2.

TABLE 1

|  | Examples | | | | | |
| --- | --- | --- | --- | --- | --- | --- |
|  | 1 | 2 | 3 | 4 | 5 | 6 |
| Copolymer | A1 | A1 | B1 | B1 | C1 | C1 |
| Thermoplastic transparent resin | A2 | A3 | B2 | B3 | C2 | C3 |
| A/B | 1.5 | 1.5 | 4.0 | 4.0 | 1.6 | 1.6 |
| Degree of hydrogenation (%) | 96 | 72 | 100 | 76 | 97 | 72 |
| Loss in weight on heating (%) | 0.0 | 1.4 | 1.2 | 3.6 | 0.2 | 3.8 |
| Glass transition temperature (° C.) | 120 | 115 | 113 | 111 | 117 | 110 |
| Total light transmittance (%) | 92 | 92 | 92 | 92 | 92 | 92 |
| Flexural strength (MPa) | 75 | 80 | 85 | 83 | 92 | 95 |
| Flexural modulus (MPa) | 2700 | 2900 | 3200 | 3300 | 2900 | 3000 |

TABLE 2

|  | Comparative Examples | | | |
| --- | --- | --- | --- | --- |
|  | 1 | 2 | 3 | 4 |
| Copolymer | A1 | A1 | B1 | B1 |
| Thermoplastic transparent resin | A1 | A4 | B1 | B4 |
| A/B | 1.5 | 1.5 | 4.0 | 4.0 |
| Degree of hydrogenation (%) | 0 | 52 | 0 | 45 |
| Loss in weight on heating (%) | 7.3 | 5.8 | 10.5 | 6.2 |
| Glass transition temperature (° C.) | 103 | 111 | 104 | 108 |
| Total light transmittance (%) | 92 | 76 | 92 | 85 |
| Flexural strength (MPa) | 116 | 95 | 118 | 101 |
| Flexural modulus (MPa) | 3500 | 3200 | 3400 | 3300 |

|  | Comparative Examples | | | |
| --- | --- | --- | --- | --- |
|  | 5 | 6 | 7 | 8 |
| Copolymer | C1 | C1 | D1 | D1 |
| Thermoplastic transparent resin | C1 | C4 | D2 | D3 |
| A/B | 1.6 | 1.6 | 0.25 | 0.25 |
| Degree of hydrogenation (%) | 0 | 50 | 95 | 70 |
| Loss in weight on heating (%) | 8.5 | 5.9 | 0.5 | 2.8 |
| Glass transition temperature (° C.) | 101 | 107 | 133 | 125 |
| Total light transmittance (%) | 92 | 72 | 91 | 91 |
| Flexural strength (MPa) | 120 | 106 | 65 | 68 |
| Flexural modulus (MPa) | 3400 | 3100 | 2800 | 2800 |

Example 7

Thermoplastic Resin Sheet

The resin A2 was formed into a single-layered sheet having a thickness of 2.0 mm at a resin temperature of 265° C. using a 65 mmφ vented sheet extruder equipped with a T-die. The sheet was evaluated for the total light transmittance, heat resistance, saturated water absorption, light resistance and surface hardness. The results are shown in Table 3.

Example 8

Thermoplastic Resin Sheet

The resin A3 was formed into a sheet having a thickness of 2.0 mm in the same manner as in Example 7. The sheet was evaluated for the total light transmittance, heat resistance, saturated water absorption, light resistance and surface hardness. The results are shown in Table 3.

Example 9

Thermoplastic Resin Sheet

The resin B2 was formed into a sheet having a thickness of 2.0 mm in the same manner as in Example 7. The sheet was evaluated for the total light transmittance, heat resistance, saturated water absorption, light resistance and surface hardness. The results are shown in Table 3.

Example 10

Thermoplastic Resin Sheet

The resin B3 was formed into a sheet having a thickness of 2.0 mm in the same manner as in Example 7. The sheet was evaluated for the total light transmittance, heat resistance, saturated water absorption, light resistance and surface hardness. The results are shown in Table 3.

Example 11

Thermoplastic Resin Sheet

The resin C2 was formed into a sheet having a thickness of 2.0 mm in the same manner as in Example 7. The sheet was evaluated for the total light transmittance, heat resistance, saturated water absorption, light resistance and surface hardness. The results are shown in Table 3.

Example 12

Thermoplastic Resin Sheet

The resin C3 was formed into a sheet having a thickness of 2.0 mm in the same manner as in Example 7. The sheet was evaluated for the total light transmittance, heat resistance, saturated water absorption, light resistance and surface hardness. The results are shown in Table 3.

Comparative Example 9

Thermoplastic Resin Sheet

The resin A1 was formed into a sheet having a thickness of 2.0 mm in the same manner as in Example 7. The sheet was evaluated for the total light transmittance, heat resistance, saturated water absorption, light resistance and surface hardness. The results are shown in Table 4.

Comparative Example 10

Thermoplastic Resin Sheet

The resin A4 was formed into a sheet having a thickness of 2.0 mm in the same manner as in Example 7. The sheet was evaluated for the total light transmittance, heat resistance, saturated water absorption, light resistance and surface hardness. The results are shown in Table 4.

Comparative Example 11

Thermoplastic Resin Sheet

The resin B1 was formed into a sheet having a thickness of 2.0 mm in the same manner as in Example 7. The sheet was evaluated for the total light transmittance, heat resistance, saturated water absorption, light resistance and surface hardness. The results are shown in Table 4.

Comparative Example 12

Thermoplastic Resin Sheet

The resin B4 was formed into a sheet having a thickness of 2.0 mm in the same manner as in Example 7. The sheet was evaluated for the total light transmittance, heat resistance, saturated water absorption, light resistance and surface hardness. The results are shown in Table 4.

Comparative Example 13

Thermoplastic Resin Sheet

The resin C1 was formed into a sheet having a thickness of 2.0 mm in the same manner as in Example 7. The sheet was evaluated for the total light transmittance, heat resistance, saturated water absorption, light resistance and surface hardness. The results are shown in Table 4.

Comparative Example 14

Thermoplastic Resin Sheet

The resin C4 was formed into a sheet having a thickness of 2.0 mm in the same manner as in Example 7. The sheet was evaluated for the total light transmittance, heat resistance, saturated water absorption, light resistance and surface hardness. The results are shown in Table 4.

Comparative Example 15

Thermoplastic Resin Sheet

The resin D1 was formed into a sheet having a thickness of 2.0 mm in the same manner as in Example 7. The sheet was evaluated for the total light transmittance, heat resistance, saturated water absorption, light resistance and surface hardness. The results are shown in Table 4.

Comparative Example 16

Thermoplastic Resin Sheet

The resin D2 was formed into a sheet having a thickness of 2.0 mm in the same manner as in Example 7. The sheet was evaluated for the total light transmittance, heat resistance, saturated water absorption, light resistance and surface hardness. The results are shown in Table 4.

TABLE 3

|  | Examples | | | | | |
| --- | --- | --- | --- | --- | --- | --- |
|  | 7 | 8 | 9 | 10 | 11 | 12 |
| Thermoplastic transparent resin | A2 | A3 | B2 | B3 | C2 | C3 |
| A/B | 1.5 | 1.5 | 4.0 | 4.0 | 1.6 | 1.6 |
| Degree of hydrogenation (%) | 96 | 72 | 100 | 76 | 97 | 72 |
| Total light transmittance (%) | 92 | 92 | 92 | 92 | 92 | 92 |
| Light resistance ($\Delta$YI) | 0.5 | 0.5 | 0.4 | 0.4 | 0.6 | 0.8 |
| Surface hardness | 3H | 3H | 4H | 3H | 3H | 3H |
| Glass transition temperature (° C.) | 120 | 115 | 113 | 111 | 117 | 110 |
| Saturated water absorption (%) | 0.6 | 0.6 | 1.1 | 1.2 | 0.6 | 0.6 |

TABLE 4

|  | Comparative Examples | | | | | | | |
| --- | --- | --- | --- | --- | --- | --- | --- | --- |
|  | 9 | 10 | 11 | 12 | 13 | 14 | 15 | 16 |
| Thermoplastic resin | A1 | A4 | B1 | B4 | C1 | C4 | D1 | D2 |
| A/B | 1.5 | 1.5 | 4.0 | 4.0 | 1.6 | 1.6 | 0.25 | 0.25 |
| Hydrogenation rate (%) | 0 | 52 | 0 | 45 | 0 | 50 | 0 | 95 |
| Total light transmittance (%) | 92 | 76 | 92 | 85 | 92 | 72 | 90 | 91 |
| Light resistance ($\Delta$YI) | 0.9 | 0.8 | 0.8 | 0.6 | 1.2 | 1.0 | 2.5 | 1.0 |
| Surface hardness | 2H | 2H | 3H | 3H | 3H | 3H | H | 2H |
| Glass transition temperature (° C.) | 103 | 111 | 104 | 108 | 101 | 107 | 101 | 133 |
| Saturated water absorption (%) | 0.8 | 0.7 | 1.3 | 1.2 | 0.8 | 0.7 | 0.3 | 0.2 |

Example 13

Recycle Thermoplastic Resin Sheet

The resin A2 was formed into a sheet having a thickness of 2.0 mm in the same manner as in Example 7. Scraps by-produced in the production of the sheet were crushed into flakes, and mixed (dry-blended) with the resin A2 in an amount of 10% by weight on the basis of the total weight of the resin A2 and the scraps. The mixture was formed into a sheet having a thickness of 2.0 mm (recycle article), which was then measured for $\Delta$YI value. The results are shown in Table 5.

Example 14

Recycle Thermoplastic Resin Sheet

The procedure as in Example 7 was repeated except for using the resin B2 in place of the resin A2, thereby obtaining a sheet having a thickness of 2.0 mm (recycle article), which was then evaluated for the recyclability. The results are shown in Table 5.

Example 15

Recycle Thermoplastic Resin Sheet

The procedure as in Example 7 was repeated except for using the resin C2 in place of the resin A2, thereby obtaining a sheet having a thickness of 2.0 mm (recycle article), which was then evaluated for the recyclability. The results are shown in Table 5.

Comparative Example 17

Recycle Thermoplastic Resin Sheet

The procedure as in Example 7 was repeated except for using the resin A1 in place of the resin A2, thereby obtaining a sheet having a thickness of 2.0 mm (recycle article), which was then evaluated for the recyclability. The results are shown in Table 5.

Comparative Example 18

Recycled Thermoplastic Resin Sheet

The procedure as in Example 7 was repeated except for using the resin B1 in place of the resin A2, thereby obtaining a sheet having a thickness of 2.0 mm (recycle article), which was then evaluated for the recyclability. The results are shown in Table 5.

Comparative Example 19

Recycled Thermoplastic Resin Sheet

The procedure as in Example 7 was repeated except for using the resin C1 in place of the resin A2, thereby obtaining a sheet having a thickness of 2.0 mm (recycle article), which was then evaluated for the recyclability. The results are shown in Table 5.

TABLE 5

|  | Examples | | | Comparative Examples | | |
| --- | --- | --- | --- | --- | --- | --- |
|  | 13 | 14 | 15 | 17 | 18 | 19 |
| Resin | A2 | B2 | C2 | A1 | B1 | C1 |
| A/B | 1.5 | 4.0 | 1.6 | 1.5 | 4.0 | 1.6 |
| Degree of hydrogenation (%) | 96 | 100 | 97 | 0 | 0 | 0 |
| Recyclability ($\Delta$YI) | 0.4 | 0.3 | 0.5 | 1.8 | 1.6 | 1.9 |

Example 16

Multi-Layered Thermoplastic Resin Sheet

A multi-layered sheet was produced by using an extruder constituted from a 65 mm$\phi$ vented single-screw sheet extruder) equipped with a T-die (main extruder, a 30 mm$\phi$ single-screw sub-extruder, a transfer roll and a take-up device. From the single-screw main extruder (barrel temperature: 250° C.), MS resin ("Estyrene MS200" available from Nippon Steel Chemical Co., Ltd.) for core layer was extruded at an extrusion rate of 20 kg/h. From the single-screw sub-extruders (barrel temperature: 250° C.), the resin A2 was extruded at an extrusion rate of 2 kg/h so as to form skin layers on both sides of the core layer, to obtain a two-kind/three-layered sheet having a total thickness of 2.0 mm (core layer: 1.8 mm; each skin layer: 0.1 mm). The multi-layered sheet was evaluated for the total light transmittance, light resistance and birefringence. The results are shown in Table 6.

Example 17

Multi-Layered Thermoplastic Resin Sheet

The procedure as in Example 16 was repeated except for using the resin A3 as the skin layer resin, thereby obtaining a multi-layered sheet which was then evaluated for the total light transmittance, light resistance and birefringence. The results are shown in Table 6.

Example 18

Multi-Layered Thermoplastic Resin Sheet

The procedure as in Example 16 was repeated except for using the resin B2 as the skin layer resin, thereby obtaining a multi-layered sheet which was then evaluated for the total light transmittance, light resistance and birefringence. The results are shown in Table 6.

Example 19

Multi-Layer Thermoplastic Resin Sheet

The procedure as in Example 16 was repeated except for using the resin C2 as the skin layer resin, thereby obtaining a multi-layered sheet which was then evaluated for the total light transmittance, light resistance and birefringence. The results are shown in Table 6.

Comparative Example 20

Multi-Layered Thermoplastic Resin Sheet

The procedure as in Example 16 was repeated except for using the resin A1 as the skin layer resin, thereby obtaining a multi-layered sheet which was then evaluated for the total light transmittance, light resistance and birefringence. The results are shown in Table 6.

Comparative Example 21

Multi-Layered Thermoplastic Resin Sheet

The procedure as in Example 16 was repeated except for using the resin A4 as the skin layer resin, thereby obtaining a multi-layered sheet which was then evaluated for the total light transmittance, light resistance and birefringence. The results are shown in Table 6.

Comparative Example 22

Multi-Layered Thermoplastic Resin Sheet

The procedure as in Example 16 was repeated except for using the resin D2 as the skin layer resin, thereby obtaining a multi-layered sheet which was then evaluated for the total light transmittance, light resistance and birefringence. The results are shown in Table 6. In the production of the multi-layered sheet, a defect such as chipping at a part of the end occurred when cutting the sheet.

Comparative Example 23

Multi-Layered Thermoplastic Resin Sheet

The procedure as in Example 16 was repeated except for using the same MS resin for the skin and core layers, thereby obtaining a multi-layered sheet which was then evaluated for the total light transmittance, light resistance and birefringence. The results are shown in Table 6.

TABLE 6

|  | Examples | | | |
| --- | --- | --- | --- | --- |
|  | 16 | 17 | 18 | 19 |
| Core layer resin | MS200 | MS200 | MS200 | MS200 |
| Skin layer resin | A2 | A3 | B2 | C2 |
| Total light transmittance (%) | 92 | 92 | 92 | 92 |
| Light resistance ($\Delta$YI) | 1.6 | 1.8 | 1.5 | 1.6 |
| Retardation (nm) | 380 | 400 | 370 | 360 |
|  | Comparative Examples | | | |
|  | 20 | 21 | 22 | 23 |
| Core layer resin | MS200 | MS200 | MS200 | MS200 |
| Skin layer resin | A1 | A4 | D2 | MS200 |
| Total light transmittance (%) | 91 | 90 | 91 | 91 |
| Light resistance ($\Delta$YI) | 2.4 | 2.3 | 2.0 | 2.8 |
| Retardation (nm) | 520 | 480 | 390 | 990 |

Example 20

Backlight-Type Light Guide Plate

A blend of 100 parts by weight of the resin A2 pellets and 0.6 part by weight of siloxane-crosslinked, light-diffusing fine particles (average particle size: 2 μm; refractive index: 1.43) was made into a thermoplastic resin sheet having a thickness of 2.0 mm in the same manner as in Example 7. The thermoplastic resin sheet was cut to prepare a resin sheet for a backlight-type light guide plate, which was then evaluated for the total light transmittance, haze, saturated water absorption and light resistance. The results are shown in Table 7.

Example 21

Backlight-Type Light Guide Plate

The procedure as in Example 20 was repeated except for using the resin A3, thereby obtaining a thermoplastic resin sheet for a backlight-type light guide plate, which was then evaluated for the total light transmittance, haze, saturated water absorption and light resistance. The results are shown in Table 7.

Example 22

Backlight-Type Light Guide Plate

The procedure as in Example 20 was repeated except for using the resin B2, thereby obtaining a thermoplastic resin sheet for a backlight-type light guide plate, which was then evaluated for the total light transmittance, haze, saturated water absorption and light resistance. The results are shown in Table 7.

Example 23

Backlight-Type Light Guide Plate

The procedure as in Example 20 was repeated except for using the resin C2, thereby obtaining a thermoplastic resin sheet for a backlight-type light guide plate, which was then evaluated for the total light transmittance, haze, saturated water absorption and light resistance. The results are shown in Table 7.

Comparative Example 24

Backlight-Type Light Guide Plate

The procedure as in Example 20 was repeated except for using the resin A1 and siloxane-crosslinked, light-diffusing fine particles having a refractive index of 1.46 and a particle size of 2 μm, thereby obtaining a thermoplastic resin sheet for a backlight-type light guide plate, which was then evaluated for the total light transmittance, haze, saturated water absorption and light resistance. The results are shown in Table 7.

Comparative Example 25

Backlight-Type Light Guide Plate

The procedure as in Example 20 was repeated except for using the resin B1, thereby obtaining a thermoplastic resin sheet for a backlight-type light guide plate, which was then evaluated for the total light transmittance, haze, saturated water absorption and light resistance. The results are shown in Table 7.

Comparative Example 26

Backlight-Type Light Guide Plate

The procedure as in Example 20 was repeated except for using the resin C1 and siloxane-crosslinked, light-diffusing fine particles having a refractive index of 1.46 and a particle size of 2 μm, thereby obtaining a thermoplastic resin sheet for a backlight-type light guide plate, which was then evaluated for the total light transmittance, haze, saturated water absorption and light resistance. The results are shown in Table 7.

Comparative Example 27

Backlight-Type Light Guide Plate

The procedure as in Example 20 was repeated except for using PMMA "EH-1000S" available from Kuraray Co., Ltd. in place of the resin A2, thereby obtaining a thermoplastic resin sheet for a backlight-type light guide plate, which was then evaluated for the total light transmittance, haze, saturated water absorption and light resistance. The results are shown in Table 7.

TABLE 7

|  | Examples |  |  |  | Comparative Examples |  |  |  |
| --- | --- | --- | --- | --- | --- | --- | --- | --- |
|  | 20 | 21 | 22 | 23 | 24 | 25 | 26 | 27 |
| Base resin | A2 | A3 | B2 | C2 | A1 | B1 | C1 | PMMA |
| Refractive index of base resin | 1.50 | 1.51 | 1.50 | 1.50 | 1.53 | 1.51 | 1.53 | 1.49 |
| Total light transmittance (%) | 68 | 62 | 67 | 60 | 48 | 52 | 51 | 70 |
| Haze (%) | 60 | 65 | 61 | 63 | 75 | 72 | 76 | 65 |
| Light resistance (ΔYI) | 0.8 | 0.8 | 0.7 | 0.7 | 1.5 | 1.3 | 1.4 | 0.6 |
| Saturated water absorption (%) | 0.5 | 0.6 | 0.7 | 0.5 | 0.8 | 1.3 | 0.8 | 2.0 |

Example 24

Lens Unit

The multi-layered thermoplastic resin sheet obtained in Example 16 was made into a lens unit, which was then evaluated for the light resistance, birefringence and adhesion. The results are shown in Table 8.

Example 25

Lens Unit

The multi-layered thermoplastic resin sheet obtained in Example 17 was made into a lens unit, which was then evaluated for the light resistance, birefringence and adhesion. The results are shown in Table 8.

Example 26

Lens Unit

The multi-layered thermoplastic resin sheet obtained in Example 18 was made into a lens unit, which was then evaluated for the light resistance, birefringence and adhesion. The results are shown in Table 8.

Example 27

Lens Unit

The multi-layered thermoplastic resin sheet obtained in Example 19 was made into a lens unit, which was then evaluated for the light resistance, birefringence and adhesion. The results are shown in Table 8.

Comparative Example 28

Lens Unit

The multi-layered thermoplastic resin sheet obtained in Comparative Example 20 was made into a lens unit, which was then evaluated for the light resistance, birefringence and adhesion. The results are shown in Table 8.

Comparative Example 29

Lens Unit

The multi-layered thermoplastic resin sheet obtained in Comparative Example 21 was made into a lens unit, which was then evaluated for the light resistance, birefringence and adhesion. The results are shown in Table 8.

Comparative Example 30

Lens Unit

The multi-layered thermoplastic resin sheet obtained in Comparative Example 22 was made into a lens unit, which was then evaluated for the light resistance, birefringence and adhesion. The results are shown in Table 8.

TABLE 8

|  | Examples |  |  |  | Comparative Examples |  |  |
| --- | --- | --- | --- | --- | --- | --- | --- |
|  | 24 | 25 | 26 | 27 | 28 | 29 | 30 |
| Core layer resin | MS200 | MS200 | MS200 | MS200 | MS200 | MS200 | MS200 |
| Skin layer resin | A2 | A3 | B2 | C2 | A1 | A4 | D2 |
| Retardation (nm) | 380 | 400 | 370 | 360 | 520 | 480 | 390 |
| Light resistance (ΔYI) | 1.6 | 1.8 | 1.5 | 1.6 | 2.4 | 2.3 | 2.0 |
| Adhesion | A | A | A | B | A | A | C |

Example 28

Front Panel

Each of the resin sheets obtained in Examples 7 to 12 was cut to prepare a front panel for projection televisions. Each front panel was resistant to scratch because of its high surface hardness as shown in Table 3, little warped by the absorption of water, and caused no color unevenness of images.

Examples 29-34

Injection-Molded Light Guide Plate

A light guide plate having a wedge cross-section was produced at a resin temperature of 290° C. using an injection molding machine "Autoshot 100B" available from Fanuc Ltd. The wedge cross-section had a width of 40 mm, a length of 60 mm, a thin-wall thickness of 0.7 mm and a thick-wall thickness of 1.0 mm. On the scarfed surface, prism patterns having a pitch of 200 µm and a depth of 5 µm were formed. The light guide plates were produced under different molding conditions, and their mirror surfaces opposite to the prism surfaces were visually observed. When sink marks or silver streaks were not found, the product was judged acceptable. The results are shown in Table 9.

TABLE 9

| | Examples | | | | | |
|---|---|---|---|---|---|---|
| | 29 | 30 | 31 | 32 | 33 | 34 |
| Resin | A2 | A3 | B2 | B3 | C2 | C3 |
| A/B | 1.5 | 1.5 | 4.0 | 4.0 | 1.6 | 1.6 |
| Degree of hydrogenation (%) | 96 | 72 | 100 | 76 | 97 | 72 |
| Loss in weight on heating (%) | 0.0 | 1.4 | 1.2 | 3.6 | 0.2 | 3.8 |
| Glass transition temperature (° C.) | 120 | 115 | 113 | 111 | 117 | 110 |
| Reproducibility | A | A | A | A | A | A |
| Uniformity of transmitted light | 5 | 7 | 12 | 15 | 5 | 8 |

Examples 35-40

Plastic Lens

Using an injection molding machine "Autoshot 100B" available from Fanuc Ltd., each double-sided convex lens having an optical effective diameter of 2.8 mm, a minimum thickness of 0.45 mm and an optical axis thickness of 1.8 mm was produced at a resin temperature of 260° C. and a mold temperature of 100° C. The plastic lenses were evaluated for the reproducibility of cavity shape. The results are shown in Table 10.

TABLE 10

| | Examples | | | | | |
|---|---|---|---|---|---|---|
| | 35 | 36 | 37 | 38 | 39 | 40 |
| Resin | A2 | A3 | B2 | B3 | C2 | C3 |
| A/B | 1.5 | 1.5 | 4.0 | 4.0 | 1.6 | 1.6 |
| Degree of hydrogenation (%) | 96 | 72 | 100 | 76 | 97 | 72 |
| Loss in weight on heating (%) | 0.0 | 1.4 | 1.2 | 3.6 | 0.2 | 3.8 |
| Glass transition temperature (° C.) | 120 | 115 | 113 | 111 | 117 | 110 |
| Reproducibility | A | A | A | A | A | A |

Examples 41-46

Substrate for Optical Recording Media

Using an injection molding machine "Autoshot 100B" available from Fanuc Ltd. and a mold for 120 mm DVD (groove depth of stamper: 160 nm; groove pitch of stamper: 0.80 µm), each disk having a thickness of 0.6 mm was produced.

TABLE 11

| | Examples | | | | | |
|---|---|---|---|---|---|---|
| | 41 | 42 | 43 | 44 | 45 | 46 |
| Resin | A2 | A3 | B2 | B3 | C2 | C3 |
| A/B | 1.5 | 1.5 | 4.0 | 4.0 | 1.6 | 1.6 |
| Degree of hydrogenation (%) | 96 | 72 | 100 | 76 | 97 | 72 |
| Loss in weight on heating (%) | 0.0 | 1.4 | 1.2 | 3.6 | 0.2 | 3.8 |
| Glass transition temperature (° C.) | 120 | 115 | 113 | 111 | 117 | 110 |
| Reproducibility | A | A | A | A | A | A |
| Heat resistance | A | A | A | B | A | B |

INDUSTRIAL APPLICABILITY

The thermoplastic transparent resin of the present invention is excellent especially in heat decomposition resistance. Since the molding defects due to thermal degradation little occur, an optical composition containing the thermoplastic transparent resin can be made into molded articles such as optical articles having a good color tone. In addition, because of a good balance in the transparency, heat deformation resistance, mechanical properties, low water absorption, low birefringence, weather resistance and light resistance, optical articles having a high quality can be produced.

The invention claimed is:

1. A co-extrusion-molded multi-layered thermoplastic resin sheet, which is configured as a component selected from the group consisting of a backlight light guide plate, a lens unit, a front panel for displays and a substrate for optical recording media, comprising a core layer, made of a benzene ring-containing resin, and a skin layer formed on both surfaces of the core layer, such that the skin layer sandwiches the core layer, the skin layer being made of a thermoplastic transparent resin,
wherein said thermoplastic transparent resin is a resin obtained by hydrogenating 70% or more of aromatic double bonds of a copolymer which is produced by polymerizing a monomer composition comprising at least one (meth)acrylic ester monomer selected from the group consisting of methyl (meth)acrylate and ethyl (meth)acrylate, and styrene, and which has a molar ratio A/B of from 1.5 to 4 wherein A is a molar amount of a constitutional unit derived from the (meth)acrylic ester monomer and B is a molar amount of a constitutional unit derived from styrene.

2. The co-extrusion-molded multi-layered thermoplastic resin sheet according to claim 1, wherein said molar ratio A/B is 1.5 to 2.5.

3. The co-extrusion-molded multi-layered thermoplastic resin sheet according to claim 1, wherein said benzene ring-containing resin is a methyl methacrylate/styrene copolymer.

4. The co-extrusion-molded multi-layered thermoplastic resin sheet according to claim 1, wherein said thermoplastic transparent resin has a glass transition temperature in the range from 110° to 140° C.

5. A backlight-type light guide plate comprising the thermoplastic resin sheet as defined in claim 1.

6. A lens unit comprising a substrate made of the thermoplastic resin sheet as defined in claim 1 and at least one kind of lens formed on one or both surfaces of the substrate.

7. A front panel for displays comprising the thermoplastic resin sheet as defined in claim 1.

* * * * *